US010885619B2

(12) United States Patent
Hewes et al.

(10) Patent No.: US 10,885,619 B2
(45) Date of Patent: Jan. 5, 2021

(54) CONTEXT-BASED IMAGERY SELECTION

(71) Applicant: GNOMMME LLC, Boston, MA (US)

(72) Inventors: Gerald Hewes, Lexington, MA (US); Joe Regan, Boston, MA (US); David Benaim, Newton Centre, MA (US); Joseph C. Cuccinelli, Jr., Needham, MA (US); Andrew Goldfarb, Brookline, MA (US)

(73) Assignee: Photo Butler, Inc., Boston, MA (US)

( * ) Notice: Subject to any disclaimer, the term of this patent is extended or adjusted under 35 U.S.C. 154(b) by 122 days.

(21) Appl. No.: 16/163,517

(22) Filed: Oct. 17, 2018

(65) Prior Publication Data

US 2019/0122354 A1 Apr. 25, 2019

Related U.S. Application Data

(60) Provisional application No. 62/573,645, filed on Oct. 17, 2017.

(51) Int. Cl.
| | | |
|---|---|---|
| *G06T 7/00* | (2017.01) | |
| *G06K 9/00* | (2006.01) | |
| *G06F 16/40* | (2019.01) | |
| *G06K 9/03* | (2006.01) | |
| G06K 9/62 | (2006.01) | |

(52) U.S. Cl.
CPC ............ *G06T 7/0002* (2013.01); *G06F 16/40* (2019.01); *G06K 9/00503* (2013.01); *G06K 9/036* (2013.01); *G06T 7/97* (2017.01); G06K 9/6255 (2013.01); G06K 2209/27 (2013.01)

(58) Field of Classification Search
USPC ........................................................ 382/276
See application file for complete search history.

(56) References Cited

U.S. PATENT DOCUMENTS

| | | | | |
|---|---|---|---|---|
| 8,589,402 | B1 * | 11/2013 | Iampietro | G06F 16/5866 707/741 |
| 8,861,801 | B2 * | 10/2014 | Sukegawa | G06K 9/00288 382/118 |
| 2003/0059107 | A1 * | 3/2003 | Sun | G06F 16/5838 382/165 |
| 2008/0082426 | A1 * | 4/2008 | Gokturk | G06Q 30/0625 705/26.62 |
| 2015/0161177 | A1 * | 6/2015 | Singh | G06F 16/532 707/722 |
| 2016/0154810 | A1 * | 6/2016 | Vaananen | G06F 16/9537 707/711 |
| 2017/0046053 | A1 * | 2/2017 | Liu | G06K 9/00718 |
| 2017/0060319 | A1 * | 3/2017 | Seo | G09G 5/38 |

(Continued)

OTHER PUBLICATIONS

International search report for PCT/US2018/56389, dated Feb. 1, 2019, 2 pages.

(Continued)

*Primary Examiner* — Jerome Grant, II
(74) *Attorney, Agent, or Firm* — Danielson Legal LLC (57) ABSTRACT

Methods and systems for selecting an image. The systems and methods may receive one or more images as well as a context associated with the received imagery. Based on the context of the received imagery, an appropriate engine may analyze the imagery by executing one or more routines. Based on the results of the analysis, one or more of the images may be selected.

20 Claims, 7 Drawing Sheets

(56) References Cited

U.S. PATENT DOCUMENTS

| | | | |
|---|---|---|---|
| 2017/0083519 A1* | 3/2017 | Huang | G06F 16/51 |
| 2017/0091628 A1* | 3/2017 | Nachman | G06N 5/022 |
| 2017/0207859 A1* | 7/2017 | Kim | H04W 76/14 |
| 2017/0243051 A1 | 8/2017 | Chukka et al. | |
| 2018/0341805 A1* | 11/2018 | Jain | G06F 16/532 |
| 2019/0007626 A1* | 1/2019 | Kirsch | G06T 7/13 |
| 2019/0066158 A1* | 2/2019 | Choi | G06K 9/66 |
| 2020/0013371 A1* | 1/2020 | Yang | G06T 7/0002 |
| 2020/0184968 A1* | 6/2020 | Han | G06N 3/00 |

OTHER PUBLICATIONS

Written opinion from the ISA for PCT/US2018/56389, dated Feb. 1, 2019, 4 pages.

* cited by examiner

CONTEXT-BASED IMAGERY SELECTION

CROSS-REFERENCE TO RELATED APPLICATIONS

The present application claims the benefit of U.S. provisional application No. 62/573,645, filed on Oct. 17, 2017, the entire disclosure of which is incorporated by reference as if set forth in its entirety herein.

TECHNICAL FIELD

Embodiments described herein generally relate to systems and methods for selecting one or more images from a plurality of images and, more particularly but not exclusively, to systems and methods for selecting one or more images by considering contextual information associated with the images.

BACKGROUND

The emergence of digital photography via cellphone cameras and other mobile devices with imagery gathering capabilities has enabled users to gather more imagery than ever. Due to the digitization of photography and increased storage abilities, there is effectively no limit to the number of pictures, videos, live photographs, or the like that one can take. A result of this, however, is that users end up with very large libraries of imagery that contain a mixture of, for example, great photographs and sub-optimal photographs.

A need exists, therefore, for systems and methods that can autonomously select the most desirable or otherwise the "best" imagery from an imagery collection.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a computer-implemented method for selecting at least one image. The method includes receiving a plurality of images using an interface to the computer; receiving, atat least one processor executing instructions stored on a memory, a context associated with the plurality of images; analyzing, using the processor, the plurality of images by executing at least one routine associated with the context; and selecting, using the processor, at least one of the plurality of images based on the results of the at least one executed routine.

In some embodiments, the context is received from a user.

In some embodiments, the method further includes assigning a context score to each of the plurality of images using the processor, wherein the context score is determined by the at least one routine associated with the context. In some embodiments, the context score is based on at least one of image context, image EXIF data, location data, image photographer, users accessing the image, objects in the image, people in the image, image focus, and user interactions with the image.

In some embodiments, selecting the at least one of the plurality of images includes selecting at least one of the plurality of images using at least one of image orientation, image capture time, people in the images, location data, and objects in the images.

In some embodiments, the method further includes predicting the context of the plurality of images using the processor to provide the context.

In some embodiments, the method further includes presenting at least one first image of the selected plurality of images to a first user and presenting at least one second image of the selected plurality of images to a second user.

In some embodiments, the method further includes sharing the at least one selected image to a plurality of authorized users.

In some embodiments, the selected plurality of images were taken across different time periods.

In some embodiments, the selected plurality of images were taken across different locations.

According to another aspect, embodiments relate to a computer-implemented system for selecting at least one image. The system includes an interface to the computer for receiving at least a plurality of images; and at least one processor executing instructions stored on a memory to receive a context associated with the plurality of images, analyze the plurality of images by executing at least one routine associated with the context, and select at least one of the plurality of images based on the results of the at least one executed routine.

In some embodiments, the context is received from a user.

In some embodiments, the at least one processor is further configured to assign a context score to each of the plurality of images using the at least one processor, wherein the context score is determined by the at least one routine associated with the context. In some embodiments, the context score is based on at least one of image context, image EXIF data, location data, image photographer, users accessing the image, objects in the image, people in the image, image focus, and user interactions with the image.

In some embodiments, the at least one processor selects at least one of the plurality of images using at least one of image orientation, image capture time, people in the images, location data, and objects in the images.

In some embodiments, the at least one processor is further configured to predict the context of the plurality of images to provide the context.

In some embodiments, the at least one processor is further configured to present at least one first image of the plurality of images to a first user, and present at least one second image of the plurality of images to a second user.

In some embodiments, the at least one processor is further configured to share the at least one selected image to a plurality of authorized users.

In some embodiments, the selected plurality of images were taken across different time periods.

In some embodiments, the selected plurality of images were taken across different locations.

BRIEF DESCRIPTION OF DRAWINGS

Non-limiting and non-exhaustive embodiments of this disclosure are described with reference to the following figures, wherein like reference numerals refer to like parts throughout the various views unless otherwise specified.

DETAILED DESCRIPTION

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment. The appearances of the phrase "in some embodiments" in various places in the specification are not necessarily all referring to the same embodiments.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

As discussed previously, the advent of digital imagery gathering devices and increased storage capabilities may lead to users having a very large library of their gathered imagery. This imagery may include photographs, videos, live-action photographs, GIFs, or the like (for simplicity, "photographs" or "imagery"). These libraries may therefore include great photographs worthy of sharing and saving, but also sub-optimal photographs. This creates a challenge for users to, for example, select the best photographs to share with others to highlight a particular event, or to transform the photographs into more permanent memories such as printed photo albums, yearly calendars, etc. For the most part, the photographs just remain on users' cameras or computers.

Attempts to solve this problem include recently-proposed automatic approaches such as Apple's Memories, Google Photos, "The Roll" by EyeEm, and My Roll from Flayvr Media. The details of these systems are generally not public. However, many of the basic image processing algorithms have been published.

These existing techniques are limited in that they do not consider the context of photograph. Rather, these techniques generally apply the same algorithms to all photographs, regardless of whether the photographs are of family events, travel photographs, etc. This potentially leads to sub-optimal selections of the "best" photographs.

The systems and methods in accordance with the various embodiments described herein address the limitations of existing techniques to automatically select the best photographs from a collection of photographs. The systems and methods may select these best photographs by considering contextual information associated therewith. A user may explicitly provide the contextual data when they create a collection of photographs or the systems and methods described herein may autonomously predict the context of the photographs.

The systems and methods described herein may select the most appropriate engine or sub-system to analyze the photographs based on the photograph context. In other words, the context of the photographs controls which engine or sub-system (for simplicity "engine") is used to analyze the photographs. Each engine may execute one or more routines specific to the context to select the best photograph(s).

Figure 1:
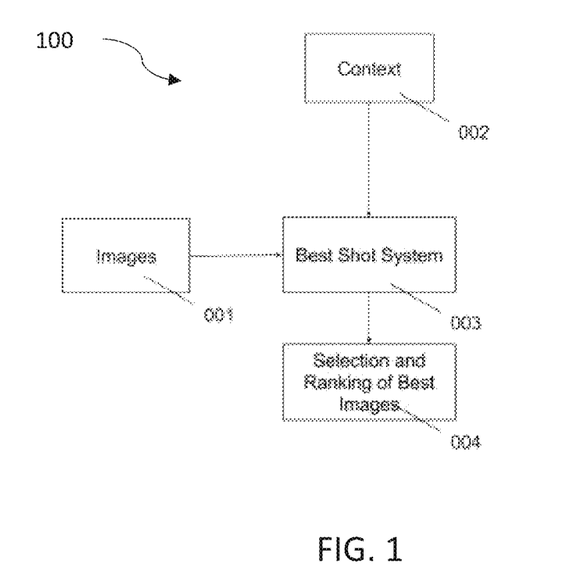
FIG. 1 illustrates an overview of a computer-implemented system for selecting an image in accordance with one embodiment.

FIG. 1 illustrates a high level overview 100 of a computer-implemented system for selecting at least one image. As seen in FIG. 1, gathered images 001 and context data 002 associated with the gathered images 001 are communicated to a "best shot system" 003. For simplicity, it may be assumed that all images 001 belong to a common context 002.

The best shot system 003 may execute one or more appropriate engines based on the context data 002 to analyze the images 001. The best shot system 003 may then output a ranking/selection of the best images 004 based on the results of the analysis.

In some embodiments, a user may upload or otherwise make all images in a set available at once. In other embodiments, a user may submit or otherwise take each photograph one at a time, and the system 003 may continuously update its recommendations for the best photographs after each photograph is uploaded, at regular time intervals, or whenever a user views the set of photographs.

The best shot system 003 can be implemented via a web service call made from a mobile device or via a web-based application designed to submit photographs to said system. In some embodiments, a user may supply an identifier, such as a URL or URI to retrieve the photographs in a set.

Figure 2:
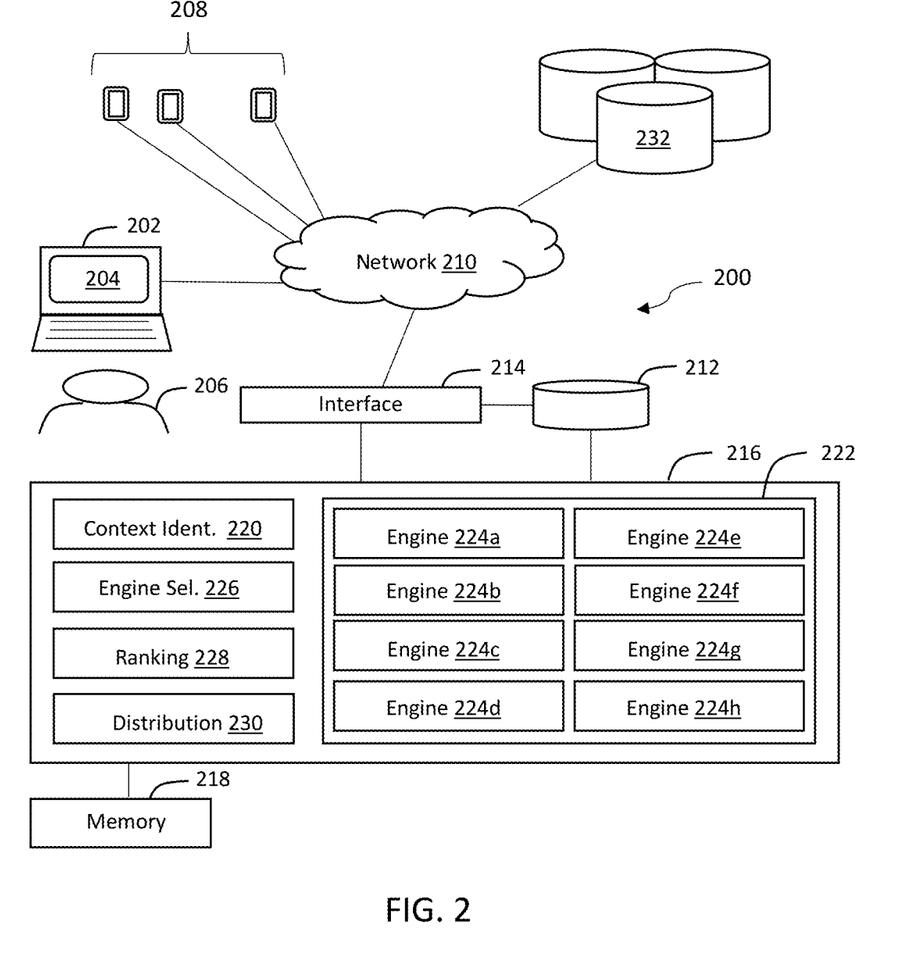
FIG. 2 presents a system for selecting at least one image in accordance with one embodiment.

FIG. 2 illustrates a system 200 for selecting at least one image in accordance with one embodiment. The system 200 is similar to the overview 100 of FIG. 1 but is illustrated in more detail.

The system 200 may include a user device 202 executing a user interface 204 accessible by one or more users 206. The user 206 may be interested in having the system 200 select the best photographs from a collection of photographs provided by user 206 and/or additional users (not shown in FIG. 2).

The user device 202 may be any hardware device capable of executing the user interface 204. The user device 202 may be configured as a laptop, PC, tablet, mobile device, or the like. The exact configuration of the user device 202 may vary as long as it can execute and present the user interface 204 to the user 206. In some embodiments, the user device 202 itself may include image-gathering capability.

In the context of the present application, the term "stream" may refer to a collection of photographs accessible to a group of users. For example, users that have access to a particular stream may upload photographs to the stream such that other users can view the uploaded photographs.

The user interface 204 may allow the user 206 to upload or otherwise provide photographs for analysis. The user interface 204 may, for example, allow the user 206 to invite others to join a stream, allow the user 206 to explicitly identify the context associated with one or more photographs, and allow the user 206 to input any specific instructions regarding photograph analysis.

In addition to the user 206 providing photographs, users of user devices 208 in communication over one or more networks 210 may also gather and provide photographs to a designated location (e.g., a file 212 accessible by multiple users). These user devices 208 may include cell phones, digital cameras, tablets, laptops, smart watches, smart jewelry, or any other type device for gathering imagery whether available now or invented hereafter.

The user 206 may invite the users of the device 208 to join a stream by, for example, sending a link to the file location 212 to which all users can provide photographs. Users may click on the link and provide any required credentials or other information to obtain access to the file location.

The gathered photographs may be communicated over one or more networks 210 to an interface 214. The network(s) 210 may link the various devices with various types of network connections. The network(s) 210 may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a Digital Subscriber Line (DSL) connection, an Ethernet connection, an Integrated Services Digital Network (ISDN) line, a dial-up port such as a V.90, a V.34, or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The network(s) 210 may also comprise, include, or interface to any one or more of a Wireless Application Protocol (WAP) link, a Wi-Fi link, a microwave link, a General Packet Radio Service (GPRS) link, a Global System for Mobile Communication G(SM) link, a Code Division Multiple Access (CDMA) link, or a Time Division Multiple access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based link.

The interface 214 may receive the gathered photographs and communicate them to a storage location 212 (e.g., a designated file location) and/or to a processor 216. The processor 216 may be any hardware device capable of executing instructions on memory 218 to select the best photograph(s) in accordance with the embodiments described herein. The processor 216 may be a microprocessor, a field programmable gate array (FPGA), a graphics processing unit, an application-specific integrated circuit (ASIC), or other similar device whether available now or invented hereafter.

In some embodiments, such as those relying on one or more ASICs, the functionality described as being provided in part via software may instead be configured into the design of the ASICs and, as such, the associated software may be omitted. The processor 216 may be configured as part of the user device 202 on which the user interface 204 executes, such as a laptop, or may be located at some remote location.

To initiate the system 200, the user 206 may first provide a context associated with the gathered photographs using the user interface 204. For example, the user interface 204 may present a drop-down menu of pre-defined contexts from which the user 206 may select the context associated with the gathered photographs.

Additionally or alternatively, the processor 216 may execute instructions stored on memory 218 to provide a context identification module 220. If, for example, the user 206 does not provide the context or if a photograph was taken outside of a stream and only later uploaded, the context identification module 220 may analyze any one or more of the gathered photographs to predict the context thereof. For illustrative purposes, the context identification module 220 may identify a wedding context based on the presence of a white dress, flowers, a wedding cake, large groups of people, and/or other objects or types of people associated with wedding ceremonies and festivities. As another example, the context identification module 220 may identify a Thanksgiving context based on the date, the presence of a turkey dinner, family members, etc. As yet another example, the context identification module 220 may identify a birthday context by detecting candles on a birthday cake, etc.

Contexts amenable for use in the systems and methods described herein may include, but are not limited to, weddings, sporting events, concerts, charity races, festivals (e.g., 4th of July-related festivals), fundraisers, holiday parties, protests, marches, trade shows, corporate outings, corporate/charity events, camps, school events (e.g., graduation ceremonies), travel excursions (e.g., vacations), landmarks, nature/landscapes (e.g., photographs taken on hikes), pets, at home, at the office, dining events, projects, etc. This list of contexts is merely exemplary and other contexts may be considered in conjunction with the systems and methods described herein.

In some embodiments, a user 206 may set up a stream to define a specific context. Grouping a set of photographs in one stream helps the system 200 identify continuity in the context. For example, a college graduation ceremony may include photographs of the graduation on the campus, as well as the ceremony with friends and family before/after the graduation.

The systems and methods described herein also do not require streams to be defined before photographs are uploaded. In other words, photographs may be selected that are independent of streams, or part of one or more streams.

The processor 216 may execute the "best shot system" 222 which may be similar to the system 003 of FIG. 1. The best shot system 222 may comprise a plurality of engines 224a-h that each execute one or more routines for a specific context such as those listed above. For example, engine 224a may execute one or more routines specific to a wedding context, engine 224b may execute one or more routines specific to a vacation context, engine 224c may execute one or more routines specific to a professional football game context, etc.

Accordingly, based on the context (whether supplied by the user 206 or predicted by the context identification module 220), an engine selection module 226 may select the most appropriate engine 224a-h to analyze the received photographs. The engines are selected and operated based on the fact that people have expectations of what should be in photographs of different contexts. When viewing pictures of a wedding, for example, people would expect/want to see pictures of the bride, the groom, the exchange of vows, the cutting of the cake, etc. Accordingly, a wedding analysis engine may search for pictures that include these items, people, or events.

As another example, for a race event, the corresponding engine may search for and select images that include shots of the finish line. In the travel context, the corresponding engine may search for and select photographs that contain landmarks such as the Eiffel Tower. For a concert context, the appropriate engine may search for and select photographs of a performer and of a stage.

Existing photograph analysis techniques recognize objects in photographs, but generally require additional processing resources as the number of different objects to be recognized increases. Additionally, and as mentioned previously, there is no consideration as to the context of the photograph to aid in the analysis.

Considering context and using specialized engines 224a-h allows for the training of more specialized algorithms and, for example, neural networks. This enables the systems and methods described herein to control the complexity of the analysis and therefore provide a more tailored analysis. This inevitably improves the functioning of the processor 216 by not expending more computing resources than necessary. It follows that, as there are targeted objects/people in the photographs to detect, the analysis of said photographs is quicker than it otherwise would be if context was not considered.

The selection of the best photographs from a stream may be implemented in two stages. First, a ranking module 228 may rank each photograph outputted or otherwise selected by an engine 224a-h. Once that process is completed, a distribution module 230 may ensure that an adequate distribution of photographs with respect to many attributes is achieved.

The ranking module 228 may generate a score for photographs analyzed by the applicable engine 224. Additionally or alternatively, the engine 224 analyzing the photographs may provide scores for the analyzed photographs. During this "scoring" phase, the ranking module 228 may compute a "context score" based on at least one of the context, the photograph itself, the photograph EXIF data, the photographer, users that have access to the photographs (e.g., access to file location 212), objects detected in the photograph, the time the photograph was taken (based on time of day, time of the year, etc.), the location where the photograph was taken, user interactions with the photograph (e.g., views, zooms, likes, shares, comments, etc.), and external data sources 232 (such as events schedules in venues, databases of celebrities, etc.).

The ranking module 228 (or the engine itself) may perform a deep analysis of the photographs to generate scores thereof. This deep analysis may identify all objects in the photograph, identify all people in the photograph, the persons' positions in the image, identify the state of mind of the people in the image (e.g., whether they are smiling, whether they have their eyes open, whether their face is in focus, whether their face is cropped, etc.). The ranking module 228 may also consider the position of objects and people in the image, the colors/light distribution and placement in the photograph, the negative space of the photograph, the sharpness of the photograph, etc.

The ranking module 228 may also recognize photographs that should not be selected. That is, photographs that are scored lower. These types of photographs may include, screenshots, pocket or "accidental" photographs, whiteboards, receipts, product tags, serial numbers, or otherwise photographs that were taken for practical or other purposes, even if they are part a stream.

In the context of the present application, the term "distribution" may refer to ensuring a variety of photograph characteristics. Proper distribution helps ensure that the system 200 does not return photographs that are too similar (e.g., identical). In other words, the distribution module 230 ensures the system 200 selects photographs of different classes (portrait orientation, landscape orientation, "selfies," group photographs, objects, cites, etc.), from different times, of different people or objects, etc.

The distribution module 230 and/or the particular engine may also organize present the photographs in a certain order. For example, an engine for analyzing, selecting, and organizing photographs of a wedding may show photographs of the exchange of vows before photographs of the cake cutting ceremony when presenting the photographs.

Similarly, the distribution module 230 may select and organize photographs by time. For example, the distribution module 230 may select the best photographs for each day of a trip or otherwise for each major time cluster of images.

Additionally or alternatively, the distribution module 230 may select and organize photographs based on where they're taken. For example, the distribution module 230 or the appropriate engine may provide photographs of a wedding grouped by photographs at a church, at the reception, at the dinner, etc.

The distribution module 230 may also select different photographs for presentation to different members of the stream. That is, the photographs selected for a first user may be different than the photographs selected for a second user. For example, the photographs selected for first user may include several photographs that include the first user, and the photographs selected for the second user may include several photographs that include the second user, etc.

The distribution module 230 may adapt the percentage of photographs selected based on, for example, the overall number of photographs taken, the average quality of the photographs, the context, or the like. For example, if a user took two hundred (200) landscape photographs, the distribution module 230 may select a smaller subset of landscape photographs (e.g., only select 10% of the overall amount of landscape photographs taken). The distribution module 230 may further modify this threshold based on whether there are many or low quality or uninteresting photographs. On the other hand, the distribution module 230 may select a larger percentage of photographs for contexts such as for an anniversary, especially if many of the photographs are of high quality with multiple portraits.

As mentioned above, the system 200 may also include or otherwise be in communication with one or more external data sources 232 to further enhance the image selection process. For example, the external data sources 232 may include calendars to help identify the timing of gathered imagery with respect to holidays (e.g., Valentine's Day, Memorial Day weekend, July 4th, Thanksgiving, Christmas, Hanukkah, etc.). These external data sources 232 may also include data regarding the schedules of celebrities, schedules of event venues, etc.

Figure 3:
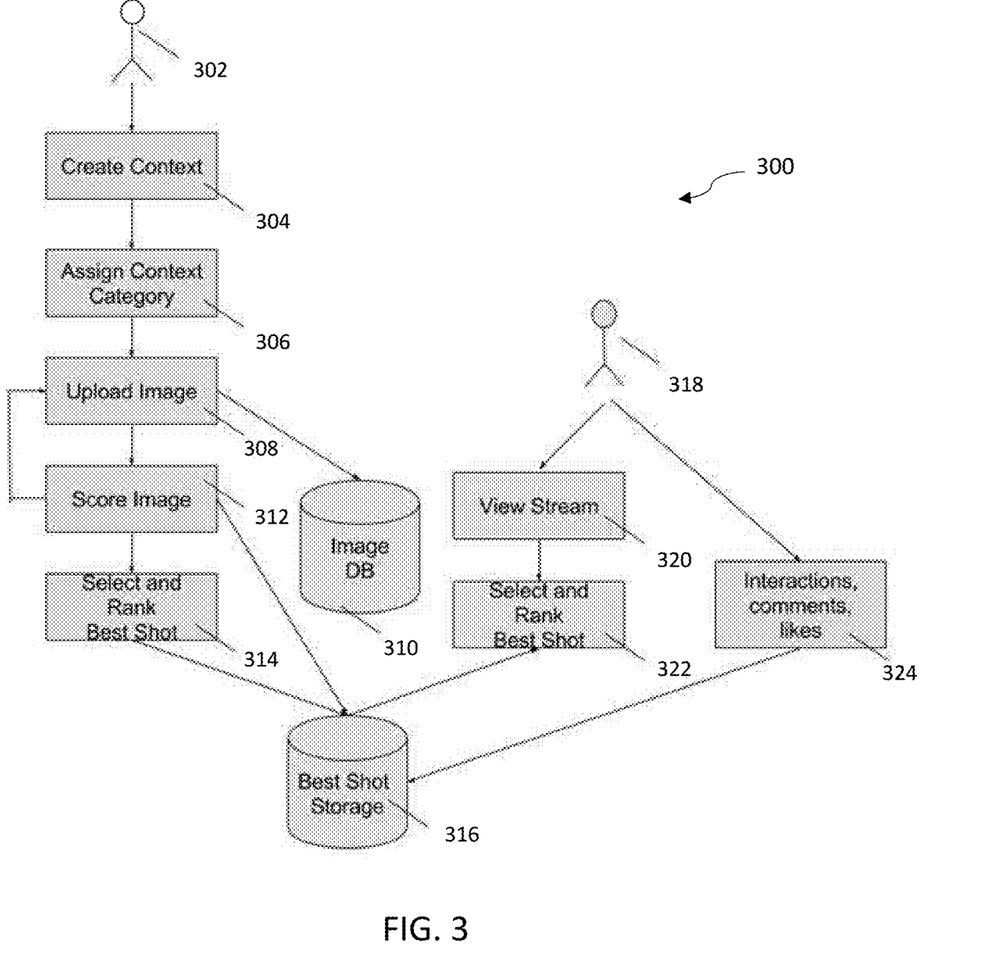
FIG. 3 depicts a flowchart of a method for operating the system of FIG. 2 in accordance with one embodiment.

FIG. 3 depicts a method 300 of operating the system of FIG. 200 in accordance with one embodiment. First, a user 302 such as the user 206 of FIG. 1 may create a context in step 304. This context may correspond to a stream/certain file location to which users may upload photographs and from which users may view uploaded photographs. In step 306, the user 302 may assign a category for the context. As mentioned previously, in some embodiments, the system may autonomously assign or otherwise predict the context.

One or more users may upload imagery such as photographs in step 308. Once uploaded, the imagery may be stored in a database or some designated location in step 310 for further access by the system. The system may access these locations to display the uploaded photographs and/or to analyze the imagery by the appropriate engine(s).

In step 312, the appropriate engine or a separate ranking module may then score the photographs uploaded in step 308. As seen in FIG. 3, steps 308 and 312 may be repeated multiple times. That is, one or more users may upload one or more photographs, which are then scored by the system 200.

In step 314, photographs are ranked based on their scores and the best/highest ranked photographs are selected. In some embodiments, the ranking and selection of the photographs is done for every uploaded photograph or after a certain number of photographs are uploaded. In some embodiments, photographs may be selected and ranked at specific time intervals. In some embodiments, photographs may be selected and ranked when they are viewed. In yet other embodiments, scores and the rankings of the photographs are stored in a data storage in step 316.

A user 318 (which may be the same or different user than user 302) may request the best photographs of the context. The user 318 may view the stream in step 320, and the best shots are returned in step 322. The system 200 may also determine how many/what percentage of the photographs should be included in the returned photographs.

When viewing the stream, the user 318 may also interact with the photographs in step 324. For example, the user 318 may zoom in on the photos, view the photographs for a certain period of time, provide some interaction that indicates the user "likes" the photograph, comment on the photograph, share the photograph with another user, etc. These interactions may also be considered in selecting the best photographs.

Figure 4:
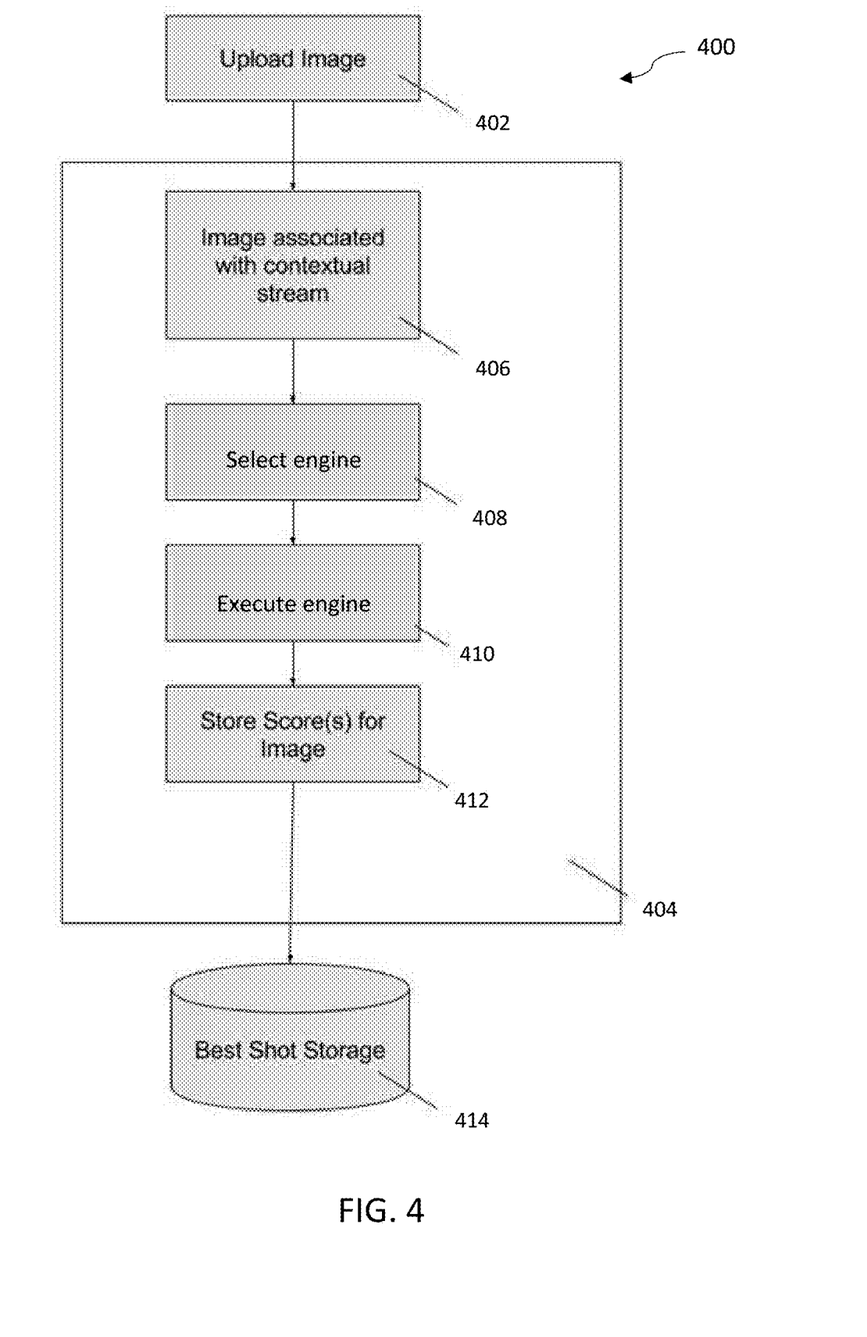
FIG. 4 depicts a flowchart of a method for scoring a photograph in accordance with one embodiment.

FIG. 4 depicts a flowchart of a method 400 for scoring a photograph in accordance with one embodiment. As in FIG. 3, a user may upload imagery such as a photograph in step 402. The scoring sub-method 404 may be performed by the processor 216 and, specifically, the engines 224*a-h*, the ranking module 228, etc.

In step 406, the uploaded photograph is associated with a contextual stream and communicated to the corresponding location. The photograph may be associated with a contextual stream based on a user explicitly identifying the context, or by the system autonomously predicting the context.

Step 408 involves selecting an engine to analyze the uploaded photograph. The engine selection module 226 of FIG. 2 may select the appropriate engine based on the context identified in step 406. As mentioned previously, different engines may analyze photographs in different ways.

Step 410 involves executing the engine selected in step 408. The selected engine may be configured to execute one or more routines using various computer vision techniques. For example, the engines may execute any one of scale-invariant feature transform (SIFT) techniques and/or speeded up robust features (SURF) techniques to analyze the uploaded photographs. Data regarding objects to be recognized may be stored in one or more databases or storage locations. For example, for a wedding context, the system 200 of FIG. 2 may be in communication with a storage location storing a library of wedding cakes to recognize the same in photographs.

In some embodiments, there may be a single engine for a given context. In other embodiments, a single engine may analyze more than one related contexts. Or, there may be multiple engines for a given context. For example, multiple engines may be available to achieve a stable system and to provide a variant to measure which engine(s) are performing the best.

The engine may provide a score for each photograph based on the results of the analysis. Or, a separate module may provide a score based on the data gathered by the engine in executing the one or more routines to analyze the photograph.

Step 412 involves storing score(s) for each photograph. The scores (and the photographs) may be communicated to and stored in a storage location 414 where they can be retrieved when required by a user and/or by the system when selecting photographs.

Figure 5:
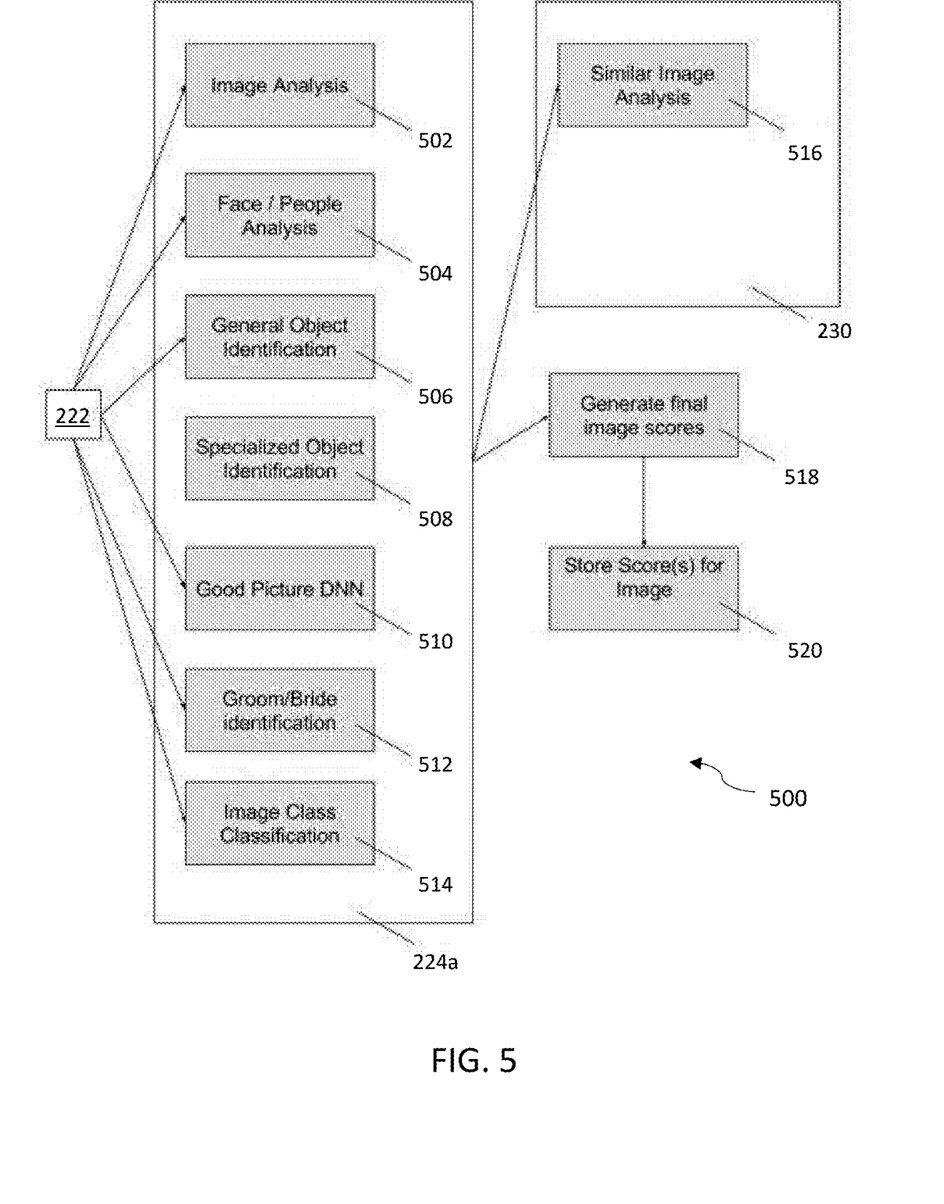
FIG. 5 depicts a flowchart of a method of analyzing a photograph in a wedding context in accordance with one embodiment.

FIG. 5 depicts a flowchart of a method 500 for analyzing a photograph in a wedding context in accordance with one embodiment. Method 500 may be performed by or otherwise include the best shot system 222 and a wedding analysis engine 224a of FIG. 2.

Once a wedding context is identified and the engine selection module 226 selects the appropriate engine (i.e., a wedding analysis engine 224a configured to analyze photographs of weddings and wedding festivities), the engine 224a may execute one or more routines to analyze the photograph(s) that are part of the stream.

The wedding analysis engine 224a may first execute an image analysis routine 502 to analyze the structure of the photograph. This routine 502 may determine whether all or part of the image is out of focus, analyze the average luminosity of the photograph to disfavor overly dark or light images, analyze the EXIF data, and analyze other similar photograph features, etc. Photographs that have favorable characteristics may be scored higher than photographs that have undesirable characteristics.

The face/people analysis routine 504 may detect/recognize faces in a photograph and output a number of people detected in the photograph. This routine 504 may therefore disfavor large crowds with no particular area of focus while favoring portraits and photographs of smaller groups of people. The face/people analysis routine 504 may recognize common users in photographs. Users that appear in multiple photographs may be considered important, and therefore the scores of those photographs may be higher than those photographs without those people.

A general object identification routine 506 may search the photographs for general objects. A specialized object identification routine 508 may search the photographs for objects that are typically found at a wedding. These objects may include a wedding cake, champagne bottles, a church alter, a white dress, a horse carriage, etc. In some embodiments, the presence of some objects will improve the score of the photographs containing those objects, and the presence of other objects will lower the score of the photographs.

In some embodiments, a general purpose deep neural network routine 510 may attempt to rate whether a photograph qualifies as a "best shot" such that it should be returned or presented to a user. In another embodiment, a context specific deep neural network may predict whether a photograph should be selected.

In some embodiments, the wedding analysis engine 224a may execute a groom/bride identification routine 512 to recognize the bride and/or the groom. This routine is similar in concept to the specialized object identification routine 508. For example, the groom/bride identification routine 512 may attempt to identify the bride by detecting the presence of a white dress or by the presence of a woman at an alter. The groom/bride identification routine 512 may recognize the groom based on the groom's presence at the altar next to the bride. Any photographs that include the bride and/or the groom may have a higher score than those that do not include the bride and/or the groom.

The image class classification routine 514 may analyze the photographs to determine their class. For example, the photograph classification may relate to whether it is in a landscape or portrait mode, a selfie or a group photograph, etc.

The distribution module 230 may execute a similar image analysis routine 516 to identify whether the analyzed photograph is a duplicate (or at least substantially similar to another photograph). Similarly, the distribution module 230 may select a collection of certain photographs to ensure an appropriate distribution as discussed previously. In some embodiments, the similar image analysis routine 516 may be executed on photographs prior to analysis by the engines.

Figure 6:
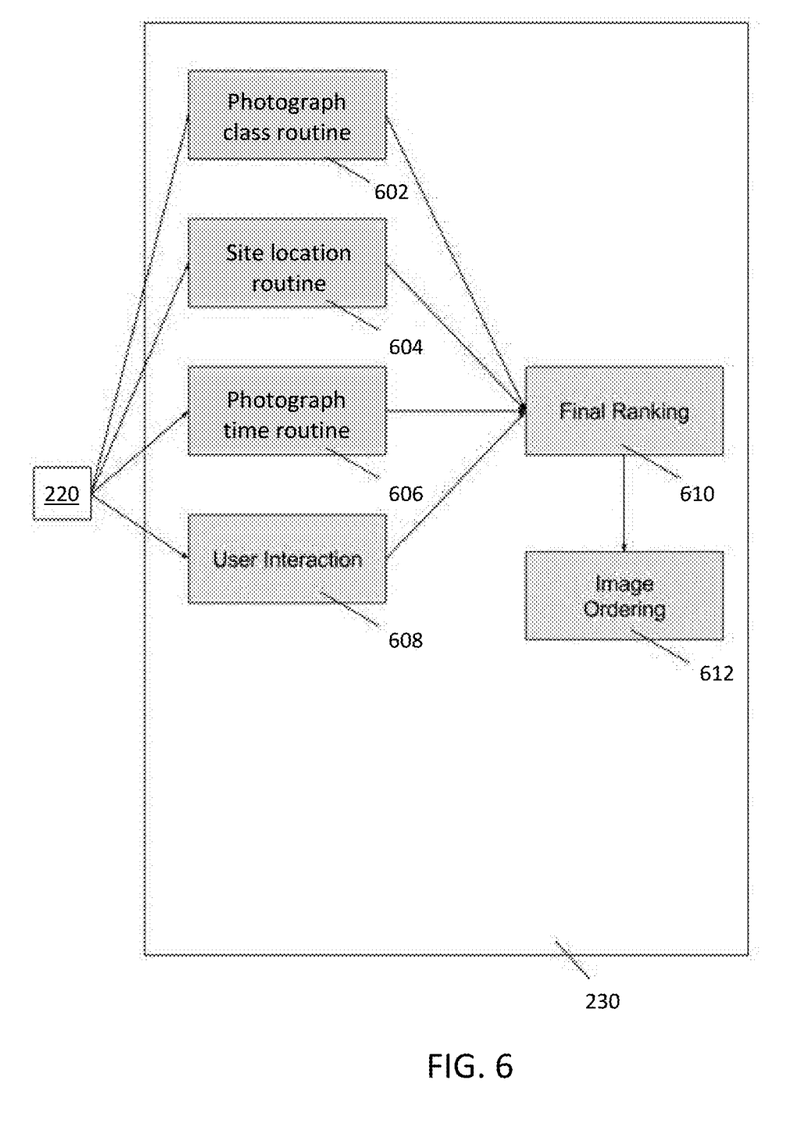
FIG. 6 illustrates the distribution module of FIG. 2 in accordance with one embodiment.

FIG. 6 depicts the distribution module 230 executed by the processor 216 in accordance with one embodiment. The distribution module 230 may execute a plurality of routines to ensure proper distribution. A photograph class routine 602 may analyze the photographs to ensure there are photographs of different classes (e.g., portraits, selfies, group photographs, landscape photographs, photographs that include objects, etc.). A photograph site location routine 604 may analyze the photographs to ensure there are photographs taken from a variety of locations (e.g., to ensure that the best images are not all from the same location). A photograph time routine 606 may analyze the photographs to ensure there are photographs taken across different time periods.

A user interaction routine 608 may examine interactions by viewers of the photographs. For example, the user interaction routine 608 may improve photograph scores based on likes, comments, views, zooms, shares, etc.

The photographs are ranked in step 610. An image order routine 612 may then sort the images to be presented in a particular order.

Referring back to FIG. 5, the wedding analysis engine 224a or the ranking module 228 of FIG. 2 may generate final image scores in step 518 based on the results of the routines 502-514. For example, scores generated by each routine (and/or the distribution module 230) may be combined into one or more scores. These scores may be used to rank the photographs as the best photographs and also stored for future use in step 520.

Figure 7:
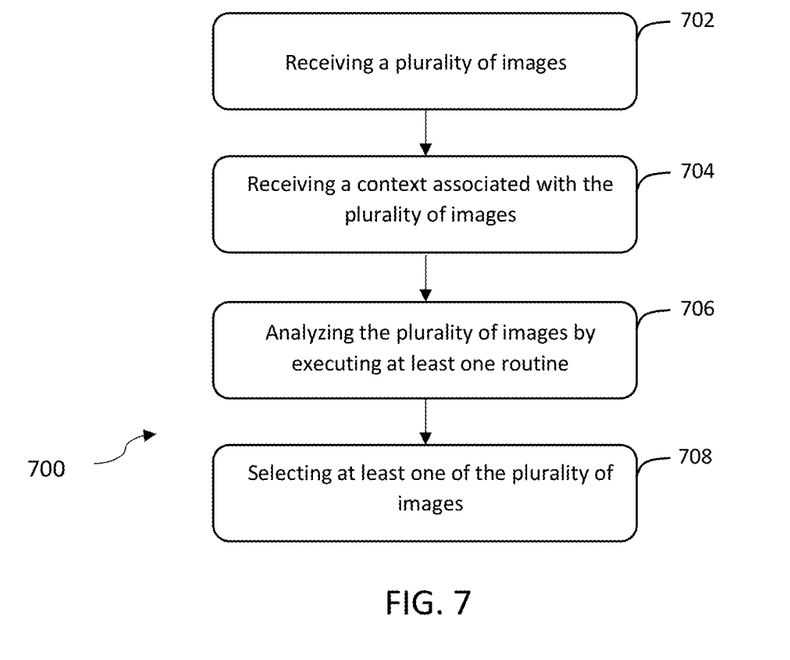
FIG. 7 depicts a flowchart of a method for selecting at least one image in accordance with one embodiment.

FIG. 7 depicts a flowchart of a computer-implemented method 700 for selecting at least one image in accordance with one embodiment. Method 700 may be performed by various components of the system of FIG. 2, for example, and may incorporate features or steps of the flow diagrams of FIGS. 3-6, for example.

Step 702 involves receiving a plurality of images using an interface to the computer. The plurality of images may be received at an interface, and may include images gathered by one or more users.

Step 704 involves receiving, at a processor executing instructions stored on a memory, a context associated with the plurality of images. As discussed previously, the systems and methods of the various embodiments described herein may consider contextual data related to the received imagery (e.g., photographs) to better analyze the imagery. A user may explicitly input or otherwise provide the context associated with the images. Additionally or alternatively, a processor such as the processor 216 of FIG. 2 may analyze the received imagery to predict the context.

Step 706 involves analyzing, using the processor, the plurality of images by executing at least one routine associated with the context. Based on the context received in step 704, a processor such as the processor 216 of FIG. 2 may select an engine to execute one or more routines to analyze the received imagery. In other words, the imagery context determines which engine analyzes the imagery. These routines may include various computer vision algorithms that are designed to detect certain objects, types of people, and other information from the received imagery.

Step 708 involves selecting, using the processor, at least one of the plurality of images based on the results of the at least one executed routine. The executed routines may also provide a score associated with the images. The scores may represent how well the images satisfy certain requirements or expectations associated with the received context. Additionally or alternatively, a separate ranking module may generate the scores for the images based on the results of the routines.

Imagery that includes certain people or objects may be ranked higher based on the context. For example, and as mentioned previously, if the context is a wedding context, then photographs that include the bride and groom may be scored or otherwise ranked higher than photographs that do not include the bride and/or the groom.

These highly-scored or otherwise highly-ranked photographs may be selected for presentation to one or more users. Additionally or alternatively, these "best" photographs may be selected and uploaded to a digital photo album.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A computer-implemented method for selecting at least one image, the method comprising:
   receiving a plurality of images using an interface to the computer;
   receiving, by at least one processor executing instructions stored on a memory, a context associated with the plurality of images;
   selecting at least one engine to analyze the plurality of images based on the received context, wherein the selected engine executes a routine associated with the context to detect preferred content of the plurality of images;
   analyzing, using the at least one selected engine, the plurality of images by executing the routine associated with the context to detect preferred content of the plurality of images; and
   selecting, using the processor, at least one of the plurality of images based on the results of the at least one executed routine.

2. The method of claim 1 wherein the context is received from a user.

3. The method of claim 1 further comprising assigning a context score to each of the plurality of images using the processor, wherein the context score is determined by the at least one routine associated with the context.

4. The method of claim 3 wherein the context score is based on at least one of image context, image EXIF data, location data, image photographer, users accessing the image, objects in the image, people in the image, image focus, and user interactions with the image.

5. The method of claim 1 wherein selecting the at least one of the plurality of images includes selecting at least one of the plurality of images using at least one of image orientation, image capture time, people in the images, location data, and objects in the images.

6. The method of claim 1 further comprising predicting the context of the plurality of images using the processor to provide the context.

7. The method of claim 1 further comprising presenting at least one first image of the selected plurality of images to a first user and presenting at least one second image of the selected plurality of images to a second user.

8. The method of claim 1 further comprising sharing the at least one selected image to a plurality of authorized users.

9. The method of claim 1 wherein the selected plurality of images were taken across different time periods.

10. The method of claim 1 wherein the selected plurality of images were taken across different locations.

11. A computer-implemented system for selecting at least one image, the system comprising:
an interface to the computer for receiving at least a plurality of images; and
at least one processor executing instructions stored on a memory to:
receive a context associated with the plurality of images,
select at last one engine to analyze the plurality of images based on the received context, wherein the selected engine executes a routine associated with the context to detect preferred content of the plurality of images;
analyze the plurality of images using the at least one selected engine by executing the routine associated with the context to detect preferred content of the plurality of images, and
select at least one of the plurality of images based on the results of the at least one executed routine.

12. The system of claim 11 wherein the context is received from a user.

13. The system of claim 11 wherein the at least one processor is further configured to assign a context score to each of the plurality of images using the at least one processor, wherein the context score is determined by the at least one routine associated with the context.

14. The system of claim 13 wherein the context score is based on at least one of image context, image EXIF data, location data, image photographer, users accessing the image, objects in the image, people in the image, image focus, and user interactions with the image.

15. The system of claim 11 wherein the processor selects at least one of the plurality of images using at least one of image orientation, image capture time, people in the images, location data, and objects in the images.

16. The system of claim 11 wherein the at least one processor is further configured to predict the context of the plurality of images to provide the context.

17. The system of claim 11 wherein the at least one processor is further configured to present at least one first image of the plurality of images to a first user, and presenting at least one second image of the plurality of images to a second user.

18. The system of claim 11 wherein the at least one processor is further configured to share the at least one selected image to a plurality of authorized users.

19. The system of claim 11 wherein the selected plurality of images were taken across different time periods.

20. The system of claim 11 wherein the selected plurality of images were taken across different locations.

* * * * *